United States Patent
Imrem et al.

(10) Patent No.: US 11,893,121 B1
(45) Date of Patent: Feb. 6, 2024

(54) APPARATUS AND METHOD FOR PROVIDING CYBER SECURITY DEFENSE IN DIGITAL ENVIRONMENTS

(71) Applicant: Second Sight Data Discovery, Inc., Bloomington, IN (US)

(72) Inventors: David Imrem, Bloomington, IN (US); Reuben Vandeventer, Bloomington, IN (US)

(73) Assignee: Second Sight Data Discovery, Inc.

( * ) Notice: Subject to any disclaimer, the term of this patent is extended or adjusted under 35 U.S.C. 154(b) by 0 days.

(21) Appl. No.: 17/963,886

(22) Filed: Oct. 11, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................... G06F 21/577; G06F 2221/034
See application file for complete search history.

(56) References Cited

U.S. PATENT DOCUMENTS

| | | | |
|---|---|---|---|
| 9,021,307 B1* | 4/2015 | Parameswaran ...... | G06F 11/008 714/37 |
| 9,117,069 B2* | 8/2015 | Oliphant ............. | H04L 63/1433 |
| 10,044,745 B1* | 8/2018 | Jones ...................... | G06F 21/55 |
| 10,230,764 B2 | 3/2019 | Ng | |
| 10,754,958 B1* | 8/2020 | Sidagni ................. | G06F 21/552 |
| 11,343,270 B1* | 5/2022 | Carter, Jr. .............. | H04L 9/088 |
| 11,477,016 B1* | 10/2022 | Carter, Jr. ............. | G06F 21/602 |
| 11,562,088 B2* | 1/2023 | Levy ..................... | G06F 16/285 |
| 2007/0143392 A1* | 6/2007 | Choe ....................... | G06F 21/57 709/203 |
| 2011/0126288 A1* | 5/2011 | Schloegel ............. | G06F 21/577 717/106 |
| 2012/0079598 A1* | 3/2012 | Brock ................... | G06F 21/577 726/25 |
| 2014/0137257 A1 | 5/2014 | Martinez | |
| 2014/0200953 A1* | 7/2014 | Mun ..................... | G06Q 10/04 705/7.28 |
| 2019/0236661 A1* | 8/2019 | Hogg ................. | G06Q 30/0282 |
| 2019/0238584 A1* | 8/2019 | Somasundaram ...... | G06F 21/55 |
| 2020/0177614 A1 | 6/2020 | Burns | |
| 2020/0329072 A1* | 10/2020 | Dubois ................. | G08B 21/18 |

(Continued)

FOREIGN PATENT DOCUMENTS

WO       2016/109608 A9    10/2016

*Primary Examiner* — Meng Li
(74) *Attorney, Agent, or Firm* — Caldwell Intellectual Property Law

(57) ABSTRACT

An apparatus and method for providing cyber security defense in digital environments are provided. The apparatus includes a processor and a memory communicatively coupled to the at least a processor. The memory contains instructions configuring the at least a processor to receive a cyber profile associated with a digital environment. The processor is also configured to receive a risk profile associated with the cyber profile and analyze the cyber profile and risk profile. In addition, the processor is configured to generate a user interface data structure configured to display the determined risk score. A graphical user interface (GUI) is communicatively connected to the processor and the GUI is configured to receive the user interface data structure for the cyber-attack defense assessment and display the cyber-attack defense assessment.

18 Claims, 6 Drawing Sheets

(56) References Cited

U.S. PATENT DOCUMENTS

| | | | |
|---|---|---|---|
| 2021/0075814 A1* | 3/2021 | Bulut | G06N 20/00 |
| 2021/0084059 A1* | 3/2021 | Sun | G06F 16/9024 |
| 2021/0084063 A1* | 3/2021 | Triantafillos | H04L 63/1433 |
| 2021/0092143 A1* | 3/2021 | Sbandi | H04L 63/1433 |
| 2021/0216928 A1* | 7/2021 | O'Toole | G06F 16/287 |
| 2021/0312058 A1* | 10/2021 | Chiarelli | G06F 21/577 |
| 2021/0336940 A1* | 10/2021 | Aslaksen | H04L 63/08 |
| 2022/0217174 A1* | 7/2022 | Dhanabalan | G06T 11/00 |
| 2022/0269583 A1* | 8/2022 | Plawecki | G06F 11/3457 |

* cited by examiner

US 11,893,121 B1

APPARATUS AND METHOD FOR PROVIDING CYBER SECURITY DEFENSE IN DIGITAL ENVIRONMENTS

FIELD OF THE INVENTION

The present invention generally relates to the field of cyber security. In particular, the present invention is directed to an apparatus and method for providing cyber security defense in digital environments.

BACKGROUND

In recent years, cyber security has become increasingly important as much of the world's information is stored digitally. Modern cyber security solutions include a wide array of variables to account for to ensure networks and highly sensitive data are secure. Sorting through the wide array of variables is time consuming and may not detect all areas that may need to be addressed. Further, it is difficult to efficiently manage and keep track of defense plans associated with cyber security. As such, modern solutions are inefficient and can be improved.

SUMMARY OF THE DISCLOSURE

In an aspect, an apparatus for providing cyber security defense in digital environments is provided. The apparatus includes a processor and a memory communicatively coupled to the at least a processor. The memory contains instructions configuring the at least a processor to receive a cyber profile associated with a digital environment. The processor is further configured to receive a risk profile associated with the cyber profile and analyze the cyber profile and risk profile. In addition, the processor is configured to generate a user interface data structure configured to display the determined risk score. A graphical user interface (GUI) is communicatively connected to the processor and the GUI is configured to receive the user interface data structure for the cyber-attack defense assessment and display the cyber-attack defense assessment.

In another aspect, a method for providing cyber security defense in digital environments is provided. The method includes receiving a cyber profile associated with a digital environment and receiving a risk profile associated with the cyber profile and analyze the cyber profile and risk profile. In addition, the method includes generating a user interface data structure configured to display the determined risk score. Further, the method may include receiving the user interface data structure for the cyber-attack defense assessment and displaying the cyber-attack defense assessment These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for providing cyber security defense in digital environments. A further aspect of the present disclosure provides a tailored, interactive graphical user interface (GUI) presented to a representative. Information displayed by the apparatus in the GUI, including a cyber-attack defense assessment, allows the representative to efficiently and in a structured manner, to address needs associated with a cyber security defense program. Aspects of the current disclosure allow for efficient and accurate evaluation of digital security defense programs associated with different digital environments.

Figure 1:
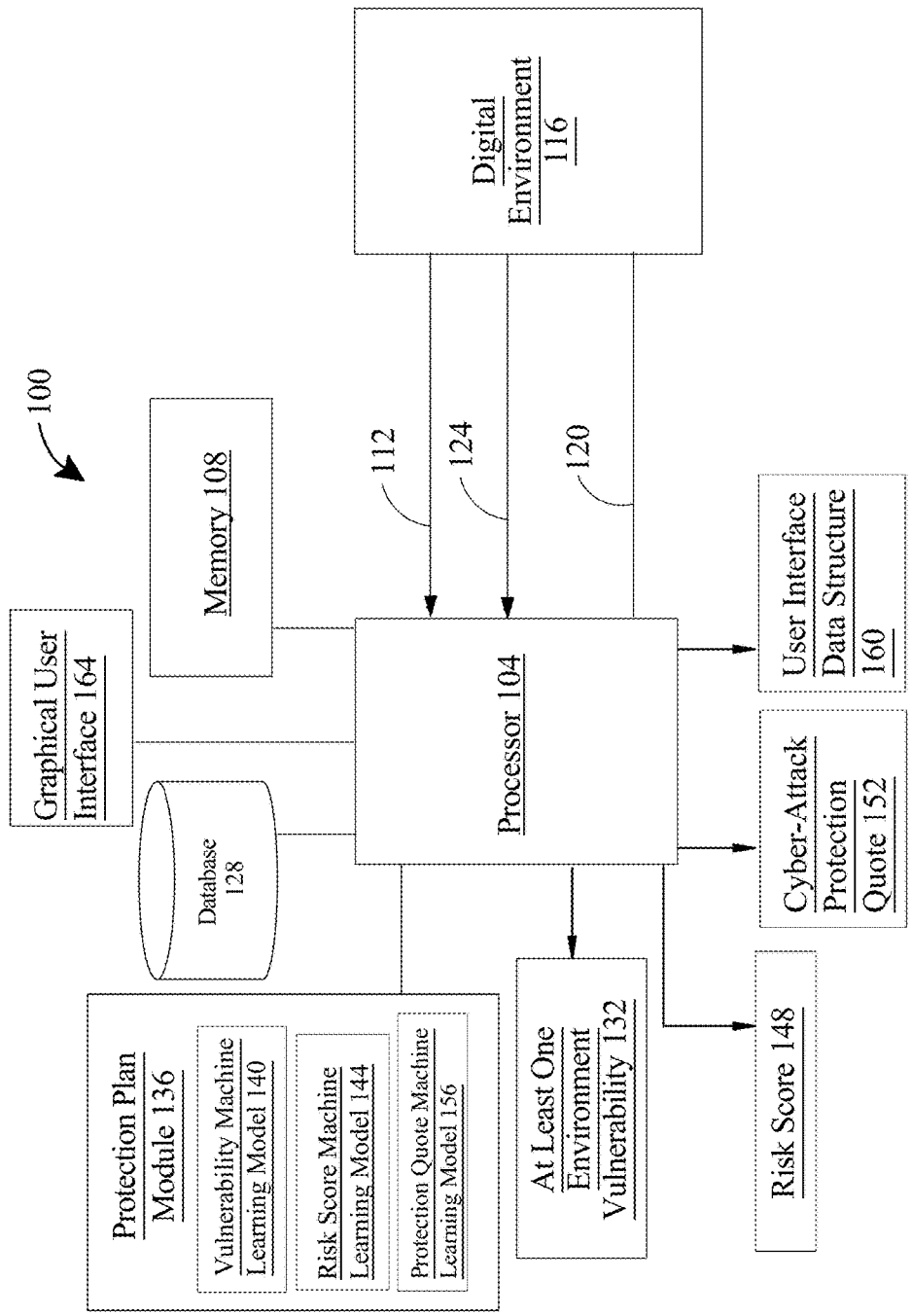
FIG. 1 is a block diagram of an apparatus for determining a risk associated with a cyber-attack.

Referring now to FIG. 1, an exemplary embodiment of an apparatus 100 for providing cyber security defense in digital environments is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to, by memory 108, perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive a cyber profile 112 from a digital environment 116. A "digital environment," for the purpose of this disclosure is an integrated communications environment where digital devices communicate and manage data and interactions within the digital environment 116. Digital device may be any computing device as described in this disclosure, for example as described in FIG. 6. For example, the digital environment 116 may be one of a computer system, computer network, and the like. In an exemplary embodiment, the digital environment 116 may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the digital environment 116 may also include any electronically based asset associated with the digital environment 116, as described in more detail below. For example, electronically based digital assets may be computer programs, data, data stores, and the like, but are not limited to such examples. The digital environment 116 may be connected to the processor 104 by a network 120, as described in more detail below.

With continued reference to FIG. 1, the cyber profile 112 may be an input into the apparatus 100. As used in this disclosure, a "cyber profile" is a collection of data and/or information about digital assets associated with the digital environment. As used in this disclosure, a "digital asset" is any electronically based asset associated with and interconnected within the digital environment 116. For example, digital assets may include servers, databases, and computing main frames for the digital environment 116. In a further exemplary embodiment, digital assets may also include computer-based programs, computer program data, and the like. Each digital asset may be connected by a communication network. The communication network 120 may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network 120 may employ a wired and/or wireless mode of communication. Further, the digital environment 116 may employ any type of network architecture. For example, the digital environment 116 may employ a peer to peer (P2P) architecture where each computing device in a computing network is connected with every computing device in the network and every computing device acts as a server for the data stored in the computing device. In a further exemplary embodiment, the digital environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment 116 may employ a mesh topology where a computing device is connected to one or multiple other computing devices using point to point connections. However, the network topology is not limited thereto. One skilled in the art will recognize the various network architectures that may be employed by the digital environment.

With further reference to FIG. 1, users may have permission to access digital assets within the digital environments. The digital assets may be accessed by users in a number of different way. For example, the digital assets may be a software as a service (SaaS, thin-client computing device, thick client computing device, and the like. In other exemplary embodiments, a user may be required to use login credentials to access the digital assets. The login in credentials may be any of login credentials at an organization level (e.g., all users for the organization use the same log in credentials) and/or individual log in credentials. One skilled in the art will recognize the various methods for user access to digital environments that may be employed by the digital environment 116. In an embodiment, at least a portion of each digital asset may also be installed on each user device associated with each user. In an exemplary embodiment, the digital assets may also be hosted on a central computing device to be accessed using user devices connected to the central server. Further, the digital environment 116 may employ one of a private network and a virtual private network (VPN) to establish a secure connection between the digital assets and the user.

For example, the cyber profile 112 may include digital profile data about the digital assets associated with the digital environment. Such digital profile data may include specification data, program data, and the like. In an exemplary embodiment, the digital profile data may include a number of computer programs used in the digital environment 116, a number of computing devices, and the like. Further, the digital profile may be associated with a risk level. For example, a larger number of computer devices may indicate an increased risk level based on more areas of vulnerability to cyber-attack associated with more computing devices. The cyber profile 112 may also include user data associated with the digital assets. For example, the user data may include a number of users with access to a digital asset, identities of users with access to a digital asset, a level of access the users have to the digital asset, a type of access associated with the users, and the like. In an exemplary embodiment, users with a higher level and/or type of access (e.g., access to more digital assets, higher levels of access, and/or more secure digital assets) may indicate an increased risk level based on the increased access to the digital assets. As used in this disclosure, "level of access" is a set of permissions and/or restrictions that are associated with each user associated with the digital environment 116. Further, as used in this disclosure, "type of access" is a classification for each user account and the level of access associated with each classification for users connected to the digital environment 116. In a further exemplary embodiment, users with a lower level and/or type of access (e.g., access to less digital assets, lower levels of access, and/or less secure digital assets) may indicate a decreased risk level based on the lesser access to the digital assets. Further, the cyber profile 112 may include protective asset data. As used in this disclosure, a "protective asset data" is a collection of digital data and/or information about protective measures the digital environment may have in place to protect the digital assets. For example, protective asset data may include data about anti-malware applications, firewalls, access restrictions, security protocols, and the like. In an exemplary embodiment, protective asset data associated with an increased level of protective assets (e.g., higher firewall settings, access restrictions, and the like) may indicate a decreased risk level. In a further exemplary embodiment, protective asset data associated with a decreased level of protective assets (e.g., lower firewall settings, access restrictions, and the like) may indicate an increased risk level based on the lesser access to the digital assets.

With further reference to FIG. 1, the processor is configured to receive risk profile 124 from the digital environment 116. The risk profile 124 may be an input into the apparatus 100. As used in this disclosure, "risk profile" is a collection of digital data and/or information associated with security of a digital environment 116. For example, the risk profile 124 may include categories such as cyber-attack protection data, degree of single points of failure data, cyber-attack recovery protocol data, and digital environment risk score but are not limited to such examples. One skilled in the art will recognize other categories of data that may be risk profile data 124.

Continuing to reference FIG. 1, in an embodiment, cyber-attack protection data may include a number of users with access to the digital environment, a level of access for each user, security protocols, security protocol levels, and the like. For example, cyber-attack protection data may include digital data and/or information about protective measures and user restrictions implemented in the digital environment. As used in this disclosure, "degree of single points of failure data" is data indicating a level of failure associated with each digital assets in the event of a cyber-attack and/or failed operation of the digital asset. Further, the degree of single points of failure data may include impact of failure data. For example, impact of failure data may include data describing a level of failure of a digital environment based on different potential cyber-attacks and different potential points of failure in digital assets. In an embodiment, impact of failure data may include instances of when a point of failure may cause interruption on a small scale (e.g., at a department level, etc.), a medium scale (e.g., at an office level, etc.), and a large scale (e.g., at an entire company level, etc.). In addition, cyber-attack recovery protocol data may include data associated with the recovery of a digital environment after a potential cyber-attack. For example, cyber-attack recovery protocol data may include data about recovery protocols that may be used such as data backup information, an amount of time needed for digital assets to recover, and the like. In a non-limiting embodiment, the risk profile 124 may include a digital environment risk record. In an embodiment, the digital environment risk record may include a risk score. As used in this disclosure, the risk score may be an indication of a level of preparedness for preventing and resolving issues associated with a cyber-attack associated with the digital environment. The risk score may also be an indication of a probability of an adverse event on the digital environment (e.g., a cyber-attack or interruption to operation continuity of the digital environment). For instance and without limitation, the digital environment risk record may be consistent with digital environment risk record in U.S. patent application Ser. No. 17/963,805 and entitled, "APPARATUS AND METHOD FOR DETERMINING A RISK ASSOCIATED WITH A CYBER-ATTACK," which is incorporated by reference herein in its entirety.

With further reference to FIG. 1, the processor 104 is further configured to analyze the cyber profile 112 and the risk profile 124. In an embodiment, the processor 104 may be configured to segment each of the cyber profile 112 and the risk profile 124 into their respective categorical data. For example, the cyber profile 112 may be segmented into digital asset profile data, user data associated with the digital assets, protective asset data, and the like. In a further example, the risk profile 124 may be segmented into cyber-attack protection data, degree of single points of failure data, cyber-attack recovery protocol data, digital environment risk record, and the like. Each of the categorical data of the cyber profile 112 and the risk profile 124 may be compared with corresponding categorical data for cyber profiles and risk profiles from digital environments separate from digital environment 116. The corresponding categorical data from other digital environments may be stored in database 128 that is communicatively connected to the processor 104. The corresponding categorical data may be associated with a specified level of cyber-security necessary to secure the associated digital environment.

Continuing to refer to FIG. 1, the processor 104 may be configured to identify at least one area of vulnerability for the digital environment 116. As used in this disclosure, "area of vulnerability" is an area of digital environment 116 that is susceptible to a cyber-attack and needs supplemental action to increase protection against cyber-attack. In an embodiment, the processor 104 may be configured to identify at least one area of vulnerability for the digital environment 116 based on the comparison of categorical data for the cyber profile 112 with corresponding categorical data of historical cyber profile data, cyber profile data of similar digital environments, and the like and/or categorical data for the risk profile 124 with corresponding categorical data of historical risk profile data, risk profile data of similar digital environments, and the like. For example, cyber-attack recovery protocol data for digital environment 116 may be compared to corresponding cyber-attack recovery protocol data for other digital environments and the processor 104 may detect an indication the cyber-attack recovery protocol data may require further attention to secure the digital environment 116 based on differences in the comparison of the two cyber-attack protocol data and identify the cyber-attack recovery protocol data as an area of vulnerability of the at least one area of vulnerability for the digital environment 116.

With further reference to FIG. 1, the processor 104 may be configured to identify at least one area of vulnerability 132 for the digital environment 116 based on the risk profile data 124. In an exemplary embodiment, the processor 104 may be configured to use at least one of the cyber-attack protection data, degree of single points of failure data, and cyber-attack recovery protocol data to determine the at least one area of vulnerability 132. For example, the processor 104 may be configured to compare each of the cyber-attack protection data, degree of single points of failure data, and cyber-attack recovery protocol data with corresponding cyber-attack protection data, degree of single points of failure data, and cyber-attack recovery protocol data for other digital environments and determine which of the cyber-attack protection data, degree of single points of failure data, and cyber-attack recovery protocol data may be an area of vulnerability based on the comparison, as described above. Additionally, or alternatively, the processor 104 may be configured to determine the at least one area of vulnerability 132 based on the cyber profile 112. In an exemplary embodiment, the processor 104 may be configured to use at least one of the digital profile data about the digital assets, user data associated with the digital assets, protective asset data, cyber-attack protection data, degree of single points of failure data, and cyber-attack recovery protocol data to identify at least one area of vulnerability for the digital environment 116. For example, the processor 104 may be configured to compare each of the digital asset data, protective asset data, cyber-attack protection data, cyber-attack protection data, degree of single points of failure data, and cyber-attack recovery protocol data with corresponding digital asset data, protective asset data, cyber-attack protection data, cyber-attack protection data, degree of single points of failure data, and cyber-attack recovery protocol data for separate digital environments and determine which of the digital asset data, protective asset data, cyber-attack protection data, cyber-attack protection data, degree of single points of failure data, and cyber-attack recovery protocol data may be an area of vulnerability based on the comparison, as described above.

Continuing to reference FIG. 1, the processor 104 may use a machine learning module, such as defense program module 136, to implement one or more algorithms or generate one or more machine-learning models, such as vulnerability machine learning model 140, to identify at least one area of vulnerability 132 for the digital environment 116. However, the machine learning module is exemplary and may not be necessary to generate the one or more machine learning models and perform any machine learning described herein. In one or more embodiments, the one or more machine-learning models may be generated using training data. Training data may include inputs and corresponding predetermined outputs so that a machine-learning model may use the correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. The exemplary inputs and outputs may come from a database, such as any database described in this disclosure, or be provided by a user such as a digital environment administrator and/or a digital security administrator. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Defense program module 136 may be used to generate vulnerability machine learning model 140 and/or any other machine learning model, such as risk score machine learning model 144 described below, using training data. Vulnerability machine learning model 140 may be trained by correlated inputs and outputs of training data. Training data may be data sets that have already been converted whether manually, by machine, or any other method. Training data may include previous outputs such that vulnerability machine learning model 140 iteratively produces outputs. Vulnerability machine learning model 140 using a machine-learning process may output converted data based on input of training data.

In an embodiment, the analyzing of the cyber profile and the risk profile may include identifying at least one area of vulnerability 132 for the digital environment 116 based on at least one of the cyber profile 112 and risk profile 124 using a machine learning model, such as vulnerability machine learning model 140 generated by defense program module 136. The vulnerability machine learning model 140 may be trained by training data, discussed in further detail below, such as vulnerability training data. Vulnerability training data may be stored in a database 128. Database 128 is discussed in further detail below.

With continued reference to FIG. 1, the identifying of the at least one environment vulnerability using a machine learning model may include receiving vulnerability training data. In an embodiment, the vulnerability training data may include a plurality of risk profile 124 data and/or cyber profile 112 data that are each correlated to one of a plurality of digital environment vulnerability data. As used in this disclosure, "digital environment vulnerability data" is data describing areas of weakness or susceptibility to cyber-attacks within computer networks, computer systems, and the like. For example, digital environment vulnerability data may be data indicating an area of weakness for a digital environment is connected to a number of users with unrestricted access to sensitive data, a low level of a firewall setting for the digital environment, and the like. For example, the vulnerability training data may be used show how risk profile data may indicate a strength or weakness in the cyber security in the digital environment. In a further embodiment, the vulnerability training data may also include a plurality of cyber profile data that are each correlated to one of a plurality of digital environment vulnerability data. In such an embodiment, the vulnerability training data may be used show how cyber profile data may indicate a strength or weakness in the cyber security in the digital environment. The identifying of the at least one environment vulnerability 132 using a machine learning model may further include training an environment vulnerability machine learning model as a function of the vulnerability training data. Further, the identifying of the at least one environment vulnerability 132 using a machine learning model may also include identifying of the at least one environment vulnerability using the trained vulnerability machine learning model. Alternatively, or additionally, defense program module 136 may use a vulnerability classifier to classify the digital asset data, user data associated with the digital assets, protective asset data, cyber-attack protection data, degree of single points of failure data, and cyber-attack recovery protocol data according to a type of digital environment vulnerability. For example, types of digital security deficiencies may include system misconfigurations, authorization credential weaknesses, software vulnerabilities, and the like. In an exemplary embodiment, system misconfigurations may include digital assets having vulnerable settings or disparate security controls. Authorization credential weaknesses may include accessing the digital environment using user credentials that were not protected and/or obtained through malfeasance. Software vulnerabilities may include unauthorized access to digital environment through vulnerabilities in older, unpatched software. One skilled in the art will recognize various other types of digital security deficiencies that may exist. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as vulnerability training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n}a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Vulnerability classifier may classify cyber profile data and risk profile to one or more types and/or category of resulting cyber-attack, which may include any type of cyber-attack, sub-categories and/or more specific categories, or the like. For instance, vulnerability classifier may receive cyber profile data and/or risk profile data with resulting cyber-attacks that occurred and may classify according to type of cyber-attack such as malware, denial-of-service, or the like. Vulnerability classifier may be trained using training data correlating cyber profile data and risk profiles in digital environments to a type of cyber-attack.

With further reference to FIG. 1, the processor 104 may be configured to calculate a risk score 144 based on the cyber profile 112 and the risk profile 124. The risk score 144 may be an indication of a probability of an adverse event on the digital environment (e.g., a cyber-attack or interruption to operation continuity of the digital environment). Additionally, or alternatively, the risk score 144 may be an indication of severity of in the event of a cyber-attack and/or preparedness for cyber-attack for the digital environment 116. In an embodiment, the risk score 144 may include a ranking out of five stars, out of a scale of 1-10, a percentage score, and the like. For example, a digital environment with a risk score of "63" may be an indication the digital environment has an increased vulnerability to a cyber-attack than a digital environment with a risk score of "87". Alternatively, or additionally, the risk score 148 may be an alphabetic score, such as, but not limited to, "A+", "A", "A−", "B+", "B", "B−", C+", "C", "C−", "D+", "D", "D−", "F", and the like. In such an embodiment, a digital environment with a risk score of "D" may be an indication the digital environment has an increased vulnerability to a cyber-attack compared to a digital environment with a risk score of "B−."

With continued reference to FIG. 1, in an embodiment, the risk score 144 may be calculated as a function of at least one of the cyber profile 112 and risk profile 124 using a machine learning model, discussed in further detail below and in FIG. 4, such as risk score machine learning model 148 generated by the defense program module 136. The risk score machine learning model 148 may be trained by training data, discussed in further detail in FIG. 4, such as risk score training data. Risk score training data may be stored in a database 128. Database 128 is discussed in further detail below.

With continued reference to FIG. 1, the calculating of the risk score 144 using a machine learning model may include receiving risk score training data from the database 128. In an embodiment, the risk score training data may include a plurality of risk profile data that are each correlated to one of a plurality of risk score data. As used in this disclosure, "risk score data" is data associating historical risk scores with different pieces of risk profile data. For example, risk score data may be calculated historical data quantifying an area of weakness for a digital environment such as a number of users with unrestricted access to sensitive data, a low level of a firewall setting for the digital environment, and the like to a risk score that may be stored in database 128. In a further embodiment, the risk score training data may also include a plurality of cyber profile data that are each correlated to one of a plurality of risk score data. The determining of the risk score using a machine learning model may further include training a risk score machine learning model 148 as a function of the risk score training data. Further, the determining of the risk score using a machine learning model may also include determining of the risk score using the trained risk score machine learning model. Alternatively, or additionally, a fuzzy inferencing system for determination of digital environment risk score may be employed, where any or all digital environment risk scores may be represented as values and/or fuzzy sets for linguistic variables measuring the same. An inferencing system may use one or more fuzzy inferencing rules, as described below in FIG. 5, to output one or more linguistic variable values and/or defuzzified values indicating risk score overall or according to categories.

Still referring to FIG. 1, the processor 104 may be configured to determine a cyber profile category risk score for each category of the cyber profile. Additionally, or alternatively, the processor 104 may be configured to determine the cyber profile category risk score for each category of the cyber profile using the risk score machine learning model 148 generated by the defense program module 136. As used in this disclosure, "cyber profile category risk score" is an indication of a level of preparedness for preventing and resolving issues associated with a cyber-attack associated with a specific category of cyber profile data. The determined cyber profile category risk score may also be an indication of a probability of an adverse event on the digital environment associated with the specific category of cyber profile data. In an embodiment, the categories of the cyber profile may be digital asset data, user data associated with the digital assets, and protective asset data, as described above, and the processor 104 may be configured to determine a cyber profile category risk score for the digital asset profiled data, user data associated with the digital assets, and protective asset data using the risk score machine learning model 148. However, the processor 104 may be configured to determine a cyber profile category risk score for any category of data associated with the cyber profile. The processor 104 may be configured to receive cyber profile category risk score training data that correlates a plurality of cyber profile category data to each of a plurality of cyber profile category risk scores, train the risk score machine learning model 148 as a function of the cyber profile category risk score training data, and determines a cyber profile category risk score for each category of the cyber profile using the trained risk score machine learning model 148. In an embodiment, the risk score machine learning model 148 may be trained using cyber profile category risk score training data to determine a relationship between an input of a plurality of cyber profile category data to calculate an output of a cyber profile category risk score.

Continuing to refer to FIG. 1, the processor 104 may be configured to determine a risk profile category risk score for each category of the risk profile. Additionally, or alternatively, the processor 104 may be configured to determine the risk profile category risk score for each category of the risk assessment category data using the risk score machine learning model 148. As used in this disclosure, "risk profile category risk score" is an indication of a level of preparedness for preventing and resolving issues associated with a cyber-attack associated with a specific category of risk profile 124. The determined risk profile category risk score may also be an indication of a probability of and identification of a vulnerability that may lead to an adverse event on the digital environment associated with the specific category of risk profile 124. In an embodiment, the categories of the risk profile category data may be cyber-attack protection data, degree of single points of failure data, and cyber-attack recovery protocol data, as described above, and the processor 104 may be configured to determine a risk profile category risk score for the cyber-attack protection data, degree of single points of failure data, and cyber-attack recovery protocol data using the risk score machine learning model 148. However, the processor 104 may be configured to determine a risk profile category risk score for any category of data associated with the risk profile category data. In an exemplary embodiment, for cyber-attack protection data, training data indicating a greater level of protection (e.g., higher firewall settings, limited user access, and the like) may be correlated to a higher risk assessment category risk score. Further, training data indicating a lesser level of protection (e.g., lower firewall settings, greater user access, and the like) may be correlated to a lower risk profile category risk score (e.g., lower numerical and/or alphabetic score). In a further exemplary embodiment, training data indicating a greater single point of failure (e.g., a larger portion of digital environment would lose functionality in a cyber-attack) may be correlated with a lower risk profile category risk score. Further, training data indicating a lesser single point of failure (e.g., a smaller portion of digital environment would lose functionality) may be correlated with a higher risk profile category risk score. In another further exemplary embodiment, training data indicating implementation of greater cyber-attack recovery protocols (e.g., data is backed up and can be recovered quickly, and the like) may be correlated with a greater risk profile category risk score (e.g., higher numeric and/or alphabetic score). Further, training data indicating implementation of lower levels cyber-attack recovery protocols (e.g., data is not backed up and can be recovered quickly, and the like) may be correlated with a lower risk profile category risk score.

With continued reference to FIG. 1, the processor 104 may be configured to receive risk profile category risk score training data that correlates a plurality of risk profile category data to a corresponding risk profile category risk score of a plurality of risk profile category risk scores, train the risk score machine learning model as a function of the risk profile category risk score training data, and determine a risk profile category risk score for each category of the risk profile using the trained risk score machine learning model 148. In an embodiment, the risk score machine learning model 148 may be trained using risk profile category risk score training data to determine a relationship between an input of a plurality of risk profile category data to calculate an output of risk profile category risk score.

Still referring to FIG. 1, in an embodiment, each cyber profile category risk score and risk profile category risk score may be a fuzzy set and/or a value of linguistic variables. "Linguistic variables" may, in a non-limiting example, cover input value factors and the "defuzzified" output may represent a score or output indicating how likely a cyber-attack is or, via a functional output or threshold comparison, be used to make a determination of a cyber profile category risk score and/or risk assessment category risk score. Linguistic variables may represent, for instance, degree of protective asset data, single point of failure data, or any other variable that may affect a probability of successful prevention of a cyber-attack. Combinations of input variables and/or member functions may be linked to and/or composed with output membership functions and/or functional output formulas such as TSK functions to generate a defuzzified probability of success, and/or score to be compared to a threshold. Any parameters, biases, weights or coefficients of membership functions may be tuned and/or trained using machine-learning algorithms as described in this disclosure. Fuzzy inferencing and logic is further described herein with reference to FIG. 5.

With further reference to FIG. 1, the processor 104 may be configured to calculate a cyber-attack defense assessment 152 for a cyber-attack defense program. As used in this disclosure, "cyber-attack protection assessment" is an estimated cost to provide a protection and coverage program for a digital environment. As used in this disclosure, "cyber-attack defense program" is a relationship between two parties for one party to protect and cover a digital environment belonging to the other party The processor 104 may be configured to calculate the cyber-attack defense assessment 152 based on and using the analysis of the cyber profile and risk profile. In an embodiment, the cyber-attack defense assessment 152 may be calculated using at least one of the at least one environment vulnerability 132, the risk score 144, cyber profile category risk scores, risk profile category risk scores, and the like as inputs. Additionally, or alternatively, the processor 104 may be configured to calculate the cyber-attack defense assessment 152 using a machine learning model, such as protection assessment machine learning model 156. The processor 104 may be configured to receive protection assessment training data that correlates a plurality of risk profile data and/or cyber profile data to a corresponding historical defense assessment of a plurality of defense assessments to determine a relationship between the input cyber profile and risk profile and a cyber-attack defense assessment, train the defense assessment machine learning model as a function of the defense assessment training data, and determine a defense assessment for digital environment using the trained defense assessment machine learning model 156.

With continued reference to FIG. 1, a processor 104 may calculate a cyber-attack defense assessment 152 using a lookup table. A "lookup table," for the purposes of this disclosure, is an array of data that maps input values to output values. A lookup table may be used to replace a runtime computation with an array indexing operation. In another non limiting example, a cyber-attack defense assessment look up table may be able to relate any of the cyber profile and/or risk profile to a cyber-attack defense assessment 152. A cyber-attack defense assessment lookup table may relate the at least one environment vulnerability, and/or risk score to a cyber-attack defense assessment 152. Processor 104 may be configured to "lookup" one or more cyber profile data, risk profile data, environment vulnerabilities, risk scores and the like, in order to find a corresponding cyber-attack defense assessment 152.

Continuing to refer to FIG. 1, the processor 104 may be configured to initiate a cyber-attack defense program issuance. As used in this disclosure, a "cyber-attack defense program issuance" is creating a cyber-attack defense program and providing the cyber-attack defense program to a network administrator and/or any other decision maker related to a digital environment. In an embodiment, the initiating of the cyber-attack defense program issuance may include generating the cyber-attack defense program and presenting the generated cyber-attack defense program to a user (e.g., network administrator for the digital environment and/or any other decision makers for the digital environment) for review. Further, the initiating of the cyber-attack defense program issuance may be based on the cyber-attack defense assessment and/or the analysis of the cyber profile and risk profile. In other words, the cyber-attack defense assessment and/or each of the data from the analysis of the cyber profile and the risk profile may effect a change in the cyber-attack defense program and the cyber-attack defense program may be presented to a user.

Still referring to FIG. 1, the processor 104 may be configured to generate a temporary cyber-attack defense program. As used in this disclosure, "temporary cyber-attack defense program" is a place holder cyber-attack defense program to provide a defense and coverage program for a digital environment against cyber-attack and digital environment failure until the full cyber-attack defense program is implemented. The temporary cyber-attack defense program may be used as an indication the digital environment is protected by a cyber-attack defense program that is not fully implemented yet. The processor 104 may be configured to determine the temporary cyber-attack defense program using cyber-attack defense assessment and/or the analysis of the cyber profile and risk profile. In other words, the cyber-attack defense assessment and/or each of the data from the analysis of the cyber profile and the risk profile may effect a change in the temporary cyber-attack defense program and the temporary cyber-attack defense may be presented to a user.

With continued reference to FIG. 1, the processor 104 may be configured to generate a user interface data structure 160 configured to display the cyber-attack defense assessment 152. Additionally, or alternatively, the processor 104 may be configured to generate the user interface data structure 160 any combination of the cyber-attack defense assessment 152, the cyber-attack defense program, and the temporary cyber-attack defense program. The user interface data structure 160 may allow any of the cyber-attack defense assessment 152, the cyber-attack defense program, and the temporary cyber-attack defense program to be displayed on a display, graphical user interface, and the like. Each of the cyber-attack defense assessment 152, the cyber-attack defense program, and the temporary cyber-attack defense program may be reviewed by a representative and/or any other associated users to review and manage any aspect of a cyber-attack defense program.

Continuing to refer to FIG. 1, the processor 104 is connected to a graphical user interface (GUI) 164 configured to display any information from apparatus 100 and/or any computing device. As used in the current disclosure, a "graphical user interface" may include a plurality of lines, images, symbols. GUI 164 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. GUI 164 may be configured to receive user input. A "user input" as used in this disclosure is information received from an individual. User input may include, for instance and without limitation, information entered via text fields, information entered via clicking on icons of a graphical user interface (GUI), information entered via touch input received through one or more touch screens, and the like.

With further reference to FIG. 1, the GUI 164 may be configured to receive the user interface data structure for any combination of the cyber-attack defense assessment 152, the cyber-attack defense program, and the temporary cyber-attack defense program. Additionally, or alternatively, the GUI 164 may be configured to display the cyber-attack defense assessment 152, the cyber-attack defense program, and the temporary cyber-attack defense program as a function of the user interface data structure for review by a user, network administrator for the digital environment, and any other decision makers for the digital environment to gather information about potential security solutions for the digital environment 116 that may need to be addressed to prevent and/or minimize the effects of a cyber-attack.

Continuing to reference FIG. 1, the GUI 164 may be configured to receive a user input related to the cyber-attack defense program. In an embodiment, the GUI 164 may be configured to receive a user input that comprises a management action for the cyber-attack defense program. A "user input" as used in this disclosure is information received from an individual. User input may include, for instance and without limitation, information entered via text fields, information entered via clicking on icons of a graphical user interface (GUI), information entered via touch input received through one or more touch screens, and the like. As used in this disclosure, "a management action" is any requested change to the cyber-attack defense program. For example, a management action may be changing for one cyber-attack defense program to another cyber-attack defense program, adjusting certain portions of the cyber-attack defense program, and the like. Further, the processor 104 may be configured to receive and implement the management action within the cyber-attack defense program and adjust the cyber-attack defense program based on the management action.

Still referring to FIG. 1, additionally, or alternatively, the GUI 164 may be configured to receiver a user input comprising a cyber-attack defense request based on the cyber-attack defense program. As used in this disclosure, a "cyber-attack defense request" is a formal request by a user associated with a digital environment for coverage and/or compensation based on the cyber-attack defense program. For example, in the event of a cyber-attack on a digital environment, an administrator for the digital environment may contact a representative for a cyber-attack defense program and initiate a cyber-attack defense request and the cyber-attack defense request may be input into the GUI by the representative for a cyber-attack defense program. Further, the processor 104 may receive the cyber-attack defense request and determine a cyber-attack defense request decision. In an embodiment, the cyber-attack defense request decision may be approving the cyber-attack defense request and/or rejecting the cyber-attack defense request. Further, if the cyber-attack defense request is approved, the processor 104 may be configured to calculate a cyber-attack defense coverage amount. As used in this disclosure, "cyber-attack defense coverage amount" is a calculated amount of protection provided by the cyber-attack defense program for an adverse event on the digital environment. Additionally, the processor 104 may be configured to calculate a cyber-attack defense coverage amount using a machine learning model, described in more detail below, such as a coverage machine learning model. Further, the coverage machine learning model may implement a decision tree for the calculation of the cyber-attack defense coverage amount.

A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes 156 to inputs of terminal nodes. Computing device 104 may generate two or more decision trees 152, which may overlap; for instance, a root node of one tree may connect to and/or receive output from one or more terminal nodes 160 of another tree, intermediate nodes of one tree may be shared with another tree, or the like.

Still referring to FIG. 1, computing device 104 may build decision tree by following relational identification; for example, relational indication may specify that a first rule module receives an input from at least a second rule module and generates an output to at least a third rule module, and so forth, which may indicate to computing device 104 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 104 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node. Continuing to refer to FIG. 1, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 2:
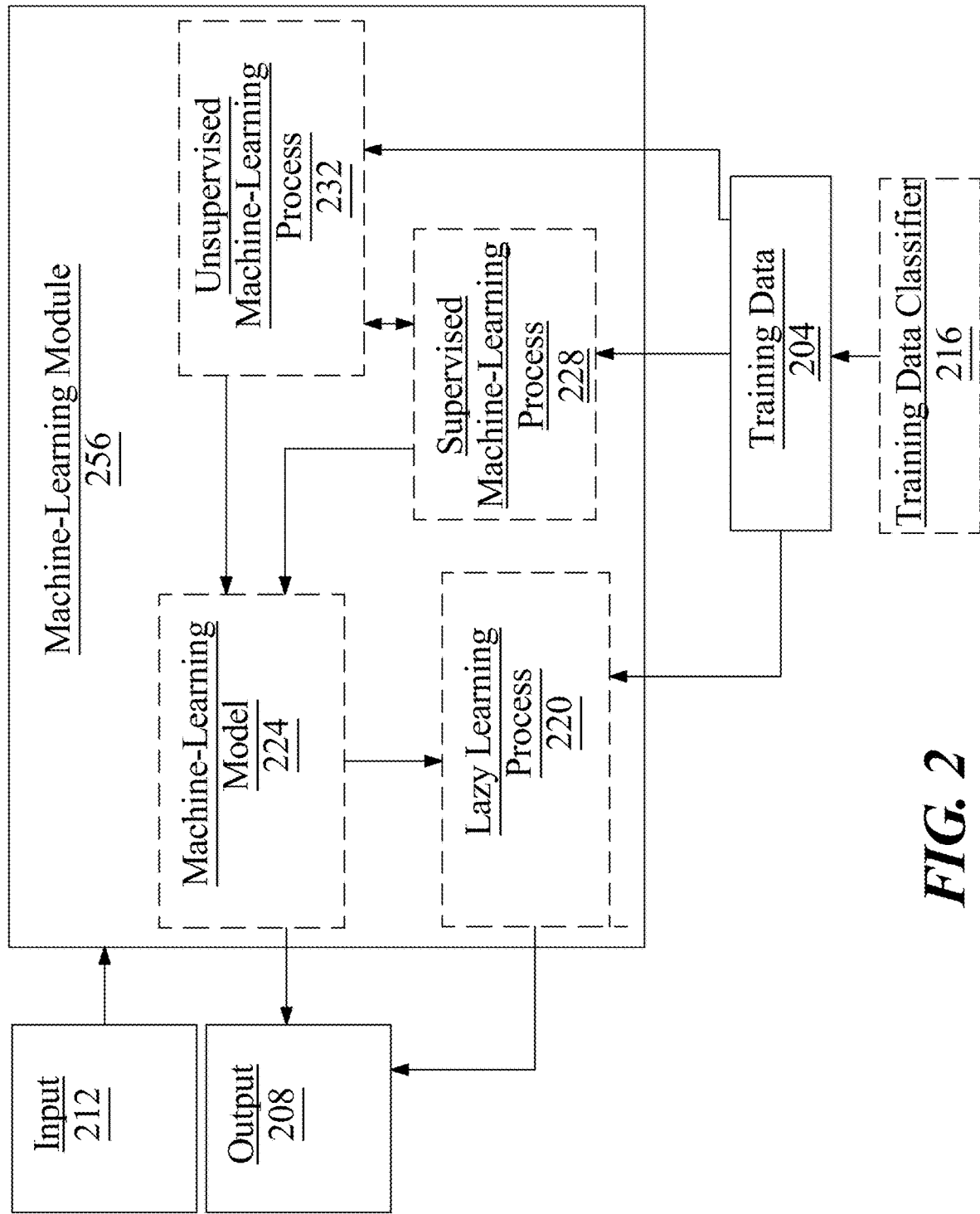
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below.

Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
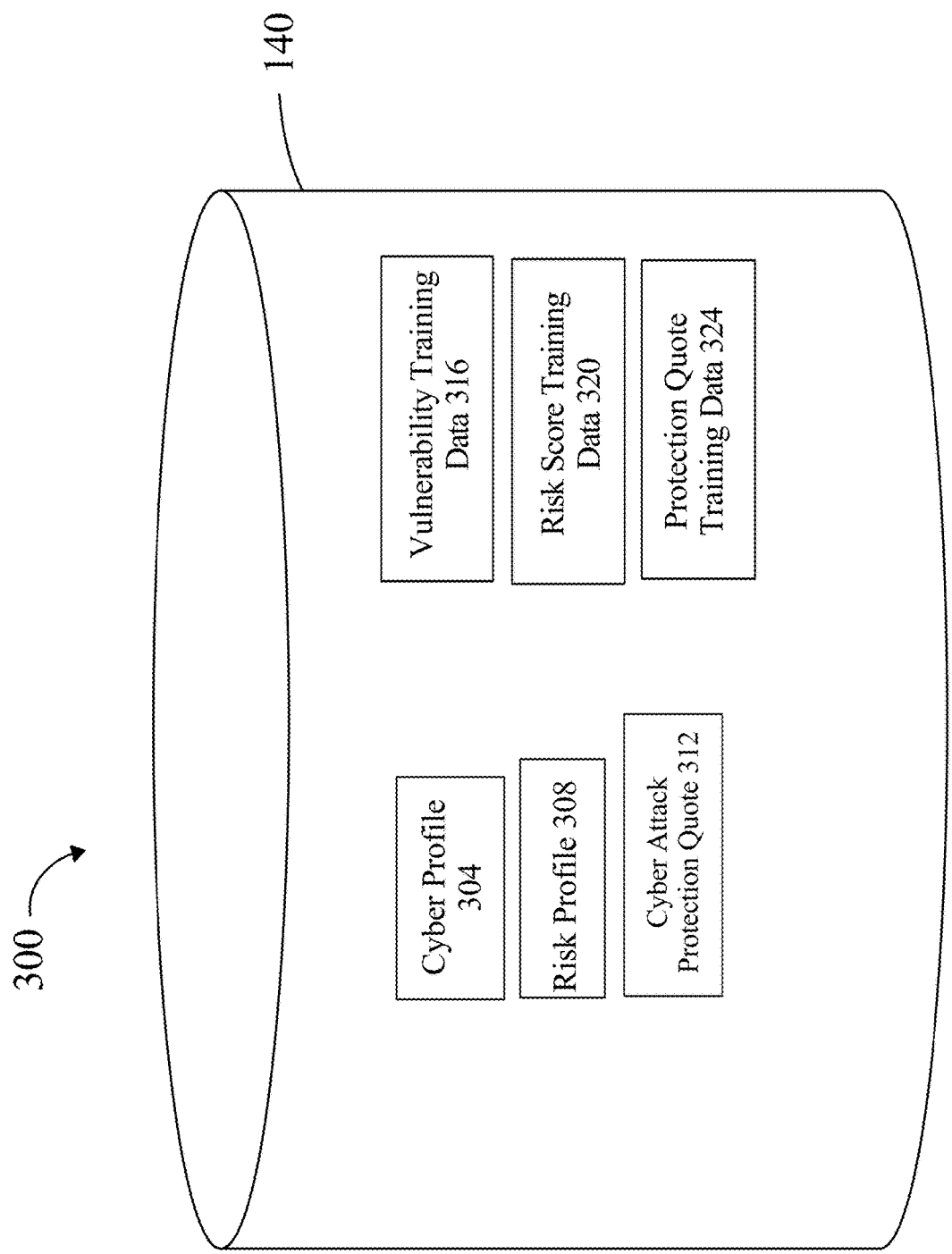
FIG. 3 is an exemplary embodiment of a database.

Now referencing FIG. 3, an exemplary embodiment 300 of database 132 is shown. Database 132 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 132 may alternatively or additionally be implemented using a distributed data storage protocol and/or data structure, such as a distributed hash table or the like. Database 132 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 132 may be used to store cyber profile 304, risk profile data 308, cyber-attack defense assessment 312, vulnerability training data 316, risk score training data 320, defense assessment training data 324, and the like. Cyber profile 304 may be consistent with any cyber profiles as discussed above. Risk profile 308 may be consistent with any risk profile data as discussed herein. Cyber-attack defense assessment 312 may be consistent with any cyber-attack defense assessment as discussed herein. Vulnerability training data 316, risk score training data 320, and defense assessment training data 324 may be consistent with any training data as discussed herein.

Figure 4:
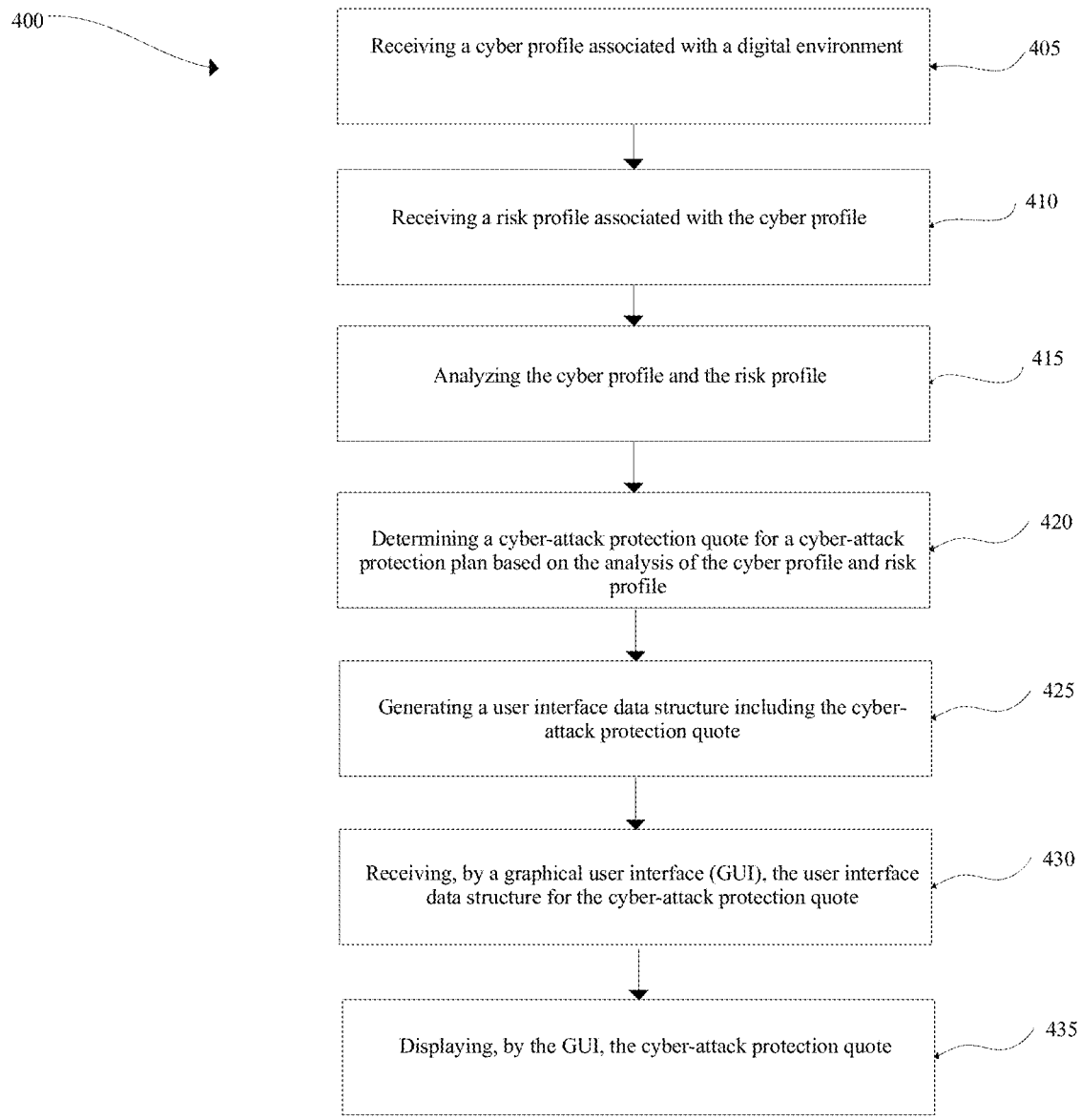
FIG. 4 is a flow diagram illustrating a method of determining a risk associated with a cyber-attack.

Referring now to FIG. 4, an exemplary embodiment of method 400 for providing cyber security defense in digital environments is shown. Step 405 of method 400 includes receiving a cyber profile associated with a digital environment. This may be implemented, without limitation, as described above in reference to FIGS. 1-3.

Still referring to FIG. 4, step 410 of method 400 includes receiving a risk profile associated with the cyber profile. This may be implemented, without limitation, as described above in reference to FIGS. 1-3.

With further reference to FIG. 4, step 415 of method 400 includes analyzing the cyber profile and the risk profile. In an embodiment, the analyzing of the cyber profile and the risk profile comprises identifying at least one area of vulnerability for the digital environment. Additionally, or alternatively, the analyzing of the cyber profile and the risk profile further comprises calculating a risk score for the digital environment. This may be implemented, without limitation, as described above in reference to FIGS. 1-3.

Continuing to reference FIG. 4, step 420 of method 400 includes calculating a cyber-attack defense assessment for a cyber-attack defense program based on the analysis of the cyber profile and risk profile. This may be implemented, without limitation, as described above in reference to FIGS. 1-3.

Still referring to FIG. 4, step 425 of method 400 includes generating a user interface data structure including the cyber-attack defense assessment. This may be implemented, without limitation, as described above in reference to FIGS. 1-3.

With further reference to FIG. 4, the method 400 may include step 430 of receiving, by a graphical user interface (GUI), the user interface data structure including the cyber-attack defense assessment and step 435 of displaying, by the GUI, the cyber-attack defense assessment. These may be implemented, without limitation, as described above in reference to FIGS. 1-3.

Continuing to reference FIG. 4, the method 400 may further comprise initiating a cyber-attack defense program issuance based on the cyber-attack defense assessment and generating the user interface data structure that further includes the cyber-attack defense assessment issuance. Additionally, or alternatively, the method 400 may further include receiving, by the GUI, the generated user interface data structure for the cyber-attack defense assessment and the cyber-attack defense assessment issuance and displaying, by the GUI, the cyber-attack defense assessment and the cyber-attack defense program issuance. These may be implemented, without limitation, as described above in reference to FIGS. 1-3.

Still referring to FIG. 4, the method 400 may include generating a temporary cyber-attack defense program based on the cyber-attack defense assessment and generating the user interface data structure that further includes the temporary cyber-attack defense program. Additionally, or alternatively, the method 400 may further include receiving, by the GUI, the generated user interface data structure for the cyber-attack defense assessment and the temporary cyber-attack defense program and displaying, by the GUI, the cyber-attack defense assessment and the temporary cyber-attack defense program. These may be implemented, without limitation, as described above in reference to FIGS. 1-3.

With further reference to FIG. 4, the method 400 may include receiving, by the GUI, a user input that comprises an action for the management of the cyber-attack defense program. Additionally, or alternatively, the method 400 may further include receiving, by the GUI, a user input comprising a cyber-attack defense request based on the cyber-attack defense program. Additionally, or alternatively, the method 400 may further include receiving, by the GUI, a cyber-attack defense request management action to update the cyber-attack defense request. These may be implemented, without limitation, as described above in reference to FIGS. 1-3.

Figure 5:
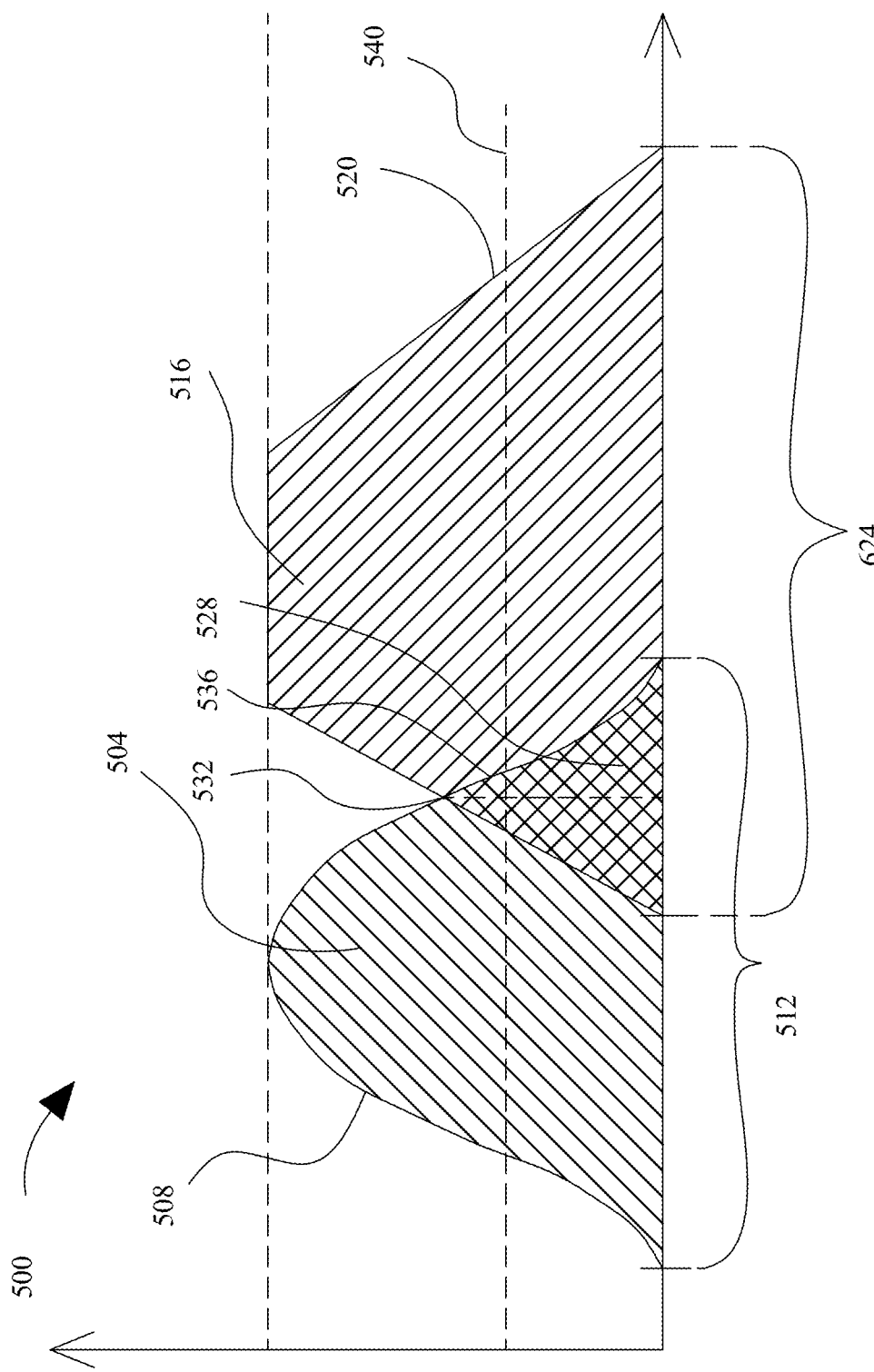
FIG. 5 is a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 562 representing a probability, as defined on probability interval, of a match between first fuzzy set 504 and second fuzzy set 516. Alternatively, or additionally, a single value of first and/or second fuzzy set may be located at a locus 566 on first range 512 and/or second range 524, where a probability of membership may be taken by evaluation of first membership function 508 and/or second membership function 520 at that range point. A probability at 528 and/or 562 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 3, in an embodiment, a degree of match between fuzzy sets may be used to classify data from the cyber profile and/or the risk profile with at least one corresponding recommended risk remediation action. For example, if digital asset profile data has a fuzzy set matching an update digital asset software fuzzy set by having a degree of overlap exceeding a threshold, computing device 104 may determine updating digital asset software as one of the at least one recommended risk remediation action. Where multiple fuzzy matches are performed, degrees of match for each respective fuzzy set may be computed and aggregated through, for instance, addition, averaging, or the like, to determine an overall degree of match.

Still referring to FIG. 5, in an embodiment, data from the cyber profile and/or the risk profile may be compared to multiple recommended risk remediation action fuzzy sets. For instance, a user data, as described above, may be represented by a fuzzy set that is compared to each of the multiple recommended risk remediation action fuzzy sets; and a degree of overlap exceeding a threshold between the user data fuzzy set and any of the multiple recommended risk remediation action fuzzy sets may cause computing device 104 to identify each of the recommended risk remediation actions as recommended risk remediation actions of the at least one recommended risk remediation actions. For instance, in one embodiment there may be two risk remediation action fuzzy sets, representing respectively increasing user restriction data and increasing user account authentication data. A number of user accounts data may have a first fuzzy set; user account restriction data may have a second fuzzy set; and user data may have a user data fuzzy set. Processor 104, for example, may compare a user data fuzzy set with each of increasing user restriction data fuzzy set and increasing user account authentication fuzzy set, as described above, and identify either, both, or neither of increasing user restriction data nor increasing user account authentication as at least one recommended risk remediation action to user data. Machine-learning methods as described throughout may, in a non-limiting example, generate coefficients used in fuzzy set equations as described above, such as without limitation x, c, and a of a Gaussian set as described above, as outputs of machine-learning methods. Likewise, user response may be used indirectly to determine a fuzzy set, as user response fuzzy set may be derived from outputs of one or more machine-learning models that take the user response directly or indirectly as inputs.

Still referring to FIG. 3, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of recommended risk remediation action as calculated using any statistical, machine-learning, or other method that may occur to a person skilled in the art upon reviewing the entirety of this disclosure. In other words, a given element of cyber profile and/or risk profile may have a first non-zero value for membership in a first linguistic variable value such as a recommended risk remediation action and a second non-zero value for membership in a second linguistic variable value such as degree of urgency. In some embodiments, determining a recommend risk remediation action may include using a linear regression model. A linear regression model may include a machine learning model. A linear regression model may be configured to map data of cyber profile and/or risk profile to one or more recommended risk remediation actions and degrees of urgency. A linear regression model may be trained using training data as discussed above. In some embodiments, determining a recommended risk remediation action may include using a recommended risk remediation action classification model. A recommended risk remediation action classification model may be configured to input collected data and cluster data to a centroid based on, but not limited to, frequency of appearance, and the like. Centroids may include compatibility scores assigned to them such that each cyber profile and risk profile may each be assigned a compatibility score. In some embodiments, an urgency classification model may include a K-means clustering model. In some embodiments, an urgency classification model may include a particle swarm optimization model. In some embodiments, determining a compatibility score of user response may user response using a fuzzy inference engine. A fuzzy inference engine may be configured to map one or more data elements using fuzzy logic. In some embodiments, a plurality of recommended risk remediation action may be arranged by a logic comparison program into compatibility score arrangements. An "compatibility score arrangement" as used in this disclosure is any grouping of objects and/or data based on degree of match for recommended risk remediation action. This step may be implemented as described above in FIGS. 1-2. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. Continuing the example, an output linguistic variable may represent, without limitation, increasing a firewall setting level. An inference engine may combine rules, such as: "if the firewall level is 'low' and the vulnerability level is 'high', the security baseline is 'low'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a,⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
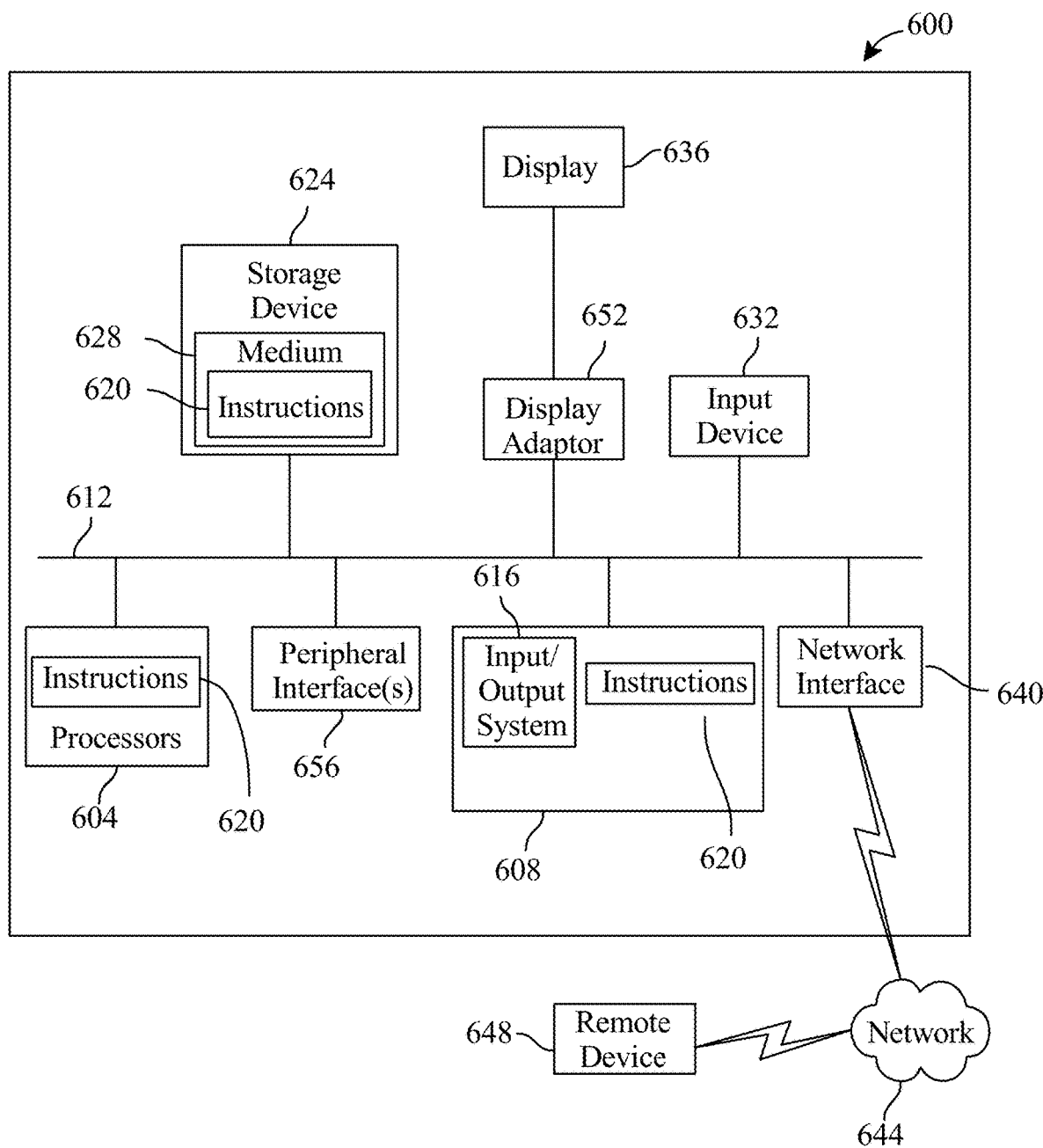
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for providing cyber security defense in digital environments, the apparatus comprising:
    at least a processor; and
    a memory communicatively coupled to the at least a processor, the memory containing instructions configuring the at least a processor to:
        receive a cyber profile associated with a digital environment;
        receive a risk profile associated with the cyber profile;
        analyze the cyber profile and the risk profile, wherein analyzing the cyber profile and the risk profile comprises identifying at least one area of vulnerability for the digital environment by utilizing a degree of single points of failure data comprising operational failure and classifying data from the cyber profile and the risk profile with at least one corresponding recommended risk remediation action;
        calculate a cyber-attack defense assessment for a cyber-attack defense program based on the analysis of the cyber profile and risk profile utilizing a protection assessment machine learning model;
        receive a cyber-attack defense request based on the cyber-attack defense program;
        determine a cyber-attack defense request decision based on the cyber-attack defense program and the cyber-attack defense request;
        calculate a cyber-attack defense coverage amount as a function of the cyber-attack defense request decision;
        generate a user interface data structure including the cyber-attack defense assessment and the cyber-attack defense request; and
    a graphical user interface (GUI) communicatively connected to the processor, the GUI configured to:
        receive the user interface data structure for the cyber-attack defense assessment; and
        display the cyber-attack defense assessment and the cyber-attack defense coverage amount.

2. The apparatus of claim 1, wherein analyzing the cyber profile and the risk profile further comprises calculating a risk score for the digital environment.

3. The apparatus of claim 1, wherein the memory further comprises instructions configuring the at least a processor to:
    initiate a cyber-attack defense program issuance based on the cyber-attack defense assessment; and
    generate the user interface data structure that further includes the cyber-attack defense program issuance.

4. The apparatus of claim 3, wherein the GUI is further configured to:
    receive the generated user interface data structure for the cyber-attack defense assessment and the cyber-attack defense program issuance; and
    display the cyber-attack defense assessment and the cyber-attack defense program issuance.

5. The apparatus of claim 1, wherein the memory further comprises instructions configuring the at least a processor to:
    generate a temporary cyber-attack defense program based on the cyber-attack defense assessment; and
    generate the user interface data structure, wherein the user interface data structure further comprises the temporary cyber-attack defense program.

6. The apparatus of claim 5, wherein the GUI is further configured to:
    receive the generated user interface data structure for the cyber-attack defense assessment and the temporary cyber-attack defense program; and
    display the cyber-attack defense assessment and the temporary cyber-attack defense.

7. The apparatus of claim 1, wherein the GUI is further configured to receive a user input comprising a modification to the cyber-attack defense program.

8. The apparatus of claim 1, wherein calculating the cyber-attack defense coverage amount comprises utilizing a coverage machine learning model.

9. The apparatus of claim 1, wherein classifying data from the cyber profile and the risk profile with the at least one corresponding recommended risk remediation action comprises a fuzzy set comparison.

10. A method for providing cyber security defense in digital environments, the method comprising:
    receiving, by a processor, a cyber profile associated with a digital environment;
    receiving, by the processor, a risk profile associated with the cyber profile;
    analyzing, by the processor, the cyber profile and the risk profile, wherein analyzing the cyber profile and the risk profile comprises identifying at least one area of vulnerability for the digital environment by utilizing a degree of single points of failure data comprising operational failure and classify data from the cyber profile and the risk profile with at least one corresponding recommended risk remediation action;
    calculating, by the processor, a cyber-attack defense assessment for a cyber-attack defense program based on the analysis of the cyber profile and risk profile utilizing a protection assessment machine learning model;
    receiving, by the processor, a cyber-attack defense request based on the cyber-attack defense program;
    determining, by the processor, a cyber-attack defense request decision based on the cyber-attack defense program and the cyber-attack defense request;
    calculating, by the processor, a cyber-attack defense coverage amount as a function of the cyber-attack defense request decision;
    generating, by the processor, a user interface data structure including the cyber-attack defense assessment and the cyber-attack defense request;
    receiving, by a graphical user interface (GUI), the user interface data structure for the cyber-attack defense assessment; and
    displaying, by the GUI, the cyber-attack defense assessment and the cyber-attack defense coverage amount.

11. The method of claim 10, wherein analyzing the cyber profile and the risk profile further comprises calculating a risk score for the digital environment.

12. The method of claim 10, further comprising:
initiating a cyber-attack defense program issuance based on the cyber-attack defense assessment; and
generating the user interface data structure that further includes the cyber-attack defense assessment issuance.

13. The method of claim 12, further comprising:
receiving, by the GUI, the generated user interface data structure for the cyber-attack defense assessment and the cyber-attack defense assessment issuance; and
displaying, by the GUI, the cyber-attack defense assessment and the cyber-attack defense program issuance.

14. The method of claim 10, further comprising:
generating a temporary cyber-attack defense program based on the cyber-attack defense assessment; and
generating the user interface data structure, wherein the user interface data structure further comprises the temporary cyber-attack defense program.

15. The method of claim 14, further comprising:
receiving, by the GUI, the generated user interface data structure for the cyber-attack defense assessment and the temporary cyber-attack defense program; and
displaying, by the GUI, the cyber-attack defense assessment and the temporary cyber-attack defense program.

16. The method of claim 10, further comprising receiving, by the GUI, a user input that comprises a management action for the cyber-attack defense program.

17. The method of claim 10, wherein calculating the cyber-attack defense coverage amount comprises utilizing a coverage machine learning model.

18. The method of claim 10, wherein classifying data from the cyber profile and the risk profile with the at least one corresponding recommended risk remediation action comprises a fuzzy set comparison.

\* \* \* \* \*